United States Patent [19]

Lumsden

[11] 4,179,489

[45] Dec. 18, 1979

[54] CHLORINATION OF IRON-CONTAINING MATERIALS

[75] Inventor: John Lumsden, Bristol, England

[73] Assignee: Mineral Process Licensing Corporation B.V., The Hague, Netherlands

[21] Appl. No.: 907,766

[22] Filed: May 19, 1978

[30] Foreign Application Priority Data

May 19, 1977 [GB] United Kingdom ............... 21189/77
Sep. 21, 1977 [GB] United Kingdom ............... 39243/77

[51] Int. Cl.² .................. C01G 23/02; C01G 49/10
[52] U.S. Cl. .................................. 423/79; 423/76;
 423/75; 423/74; 423/138; 423/148; 423/539
[58] Field of Search ........................... 423/74–79,
 423/148; 75/112, 113

[56] References Cited

U.S. PATENT DOCUMENTS

| | | | |
|---|---|---|---|
| 1,834,622 | 12/1931 | Jenness | 423/76 |
| 2,245,076 | 6/1941 | Muskat et al. | |
| 2,701,179 | 2/1955 | McKinney | 423/74 |
| 2,970,887 | 2/1961 | Hill | 423/79 |
| 3,628,913 | 12/1971 | Uhland | |
| 3,690,828 | 9/1972 | Baetz et al. | 423/149 |
| 4,017,304 | 4/1977 | Glaeser | 423/76 |

FOREIGN PATENT DOCUMENTS

1180912 2/1970 United Kingdom.

Primary Examiner—Herbert T. Carter
Attorney, Agent, or Firm—Holman & Stern

[57] ABSTRACT

A process for the chlorination of a material containing iron and titanium chemically combined with oxygen, comprising feeding the material to be chlorinated, in particulate solid form, into a reaction bed of solids containing ferrous chloride, and reacting it within that bed, at a temperature below the melting point of ferrous chloride, with a controlled amount of chlorine in the presence of sulphur in free or combined form, to produce solid ferrous chloride, titanium chloride, which is volatile at a temperature of operation, and sulphur dioxide, as the principal products of the process.

16 Claims, 11 Drawing Figures

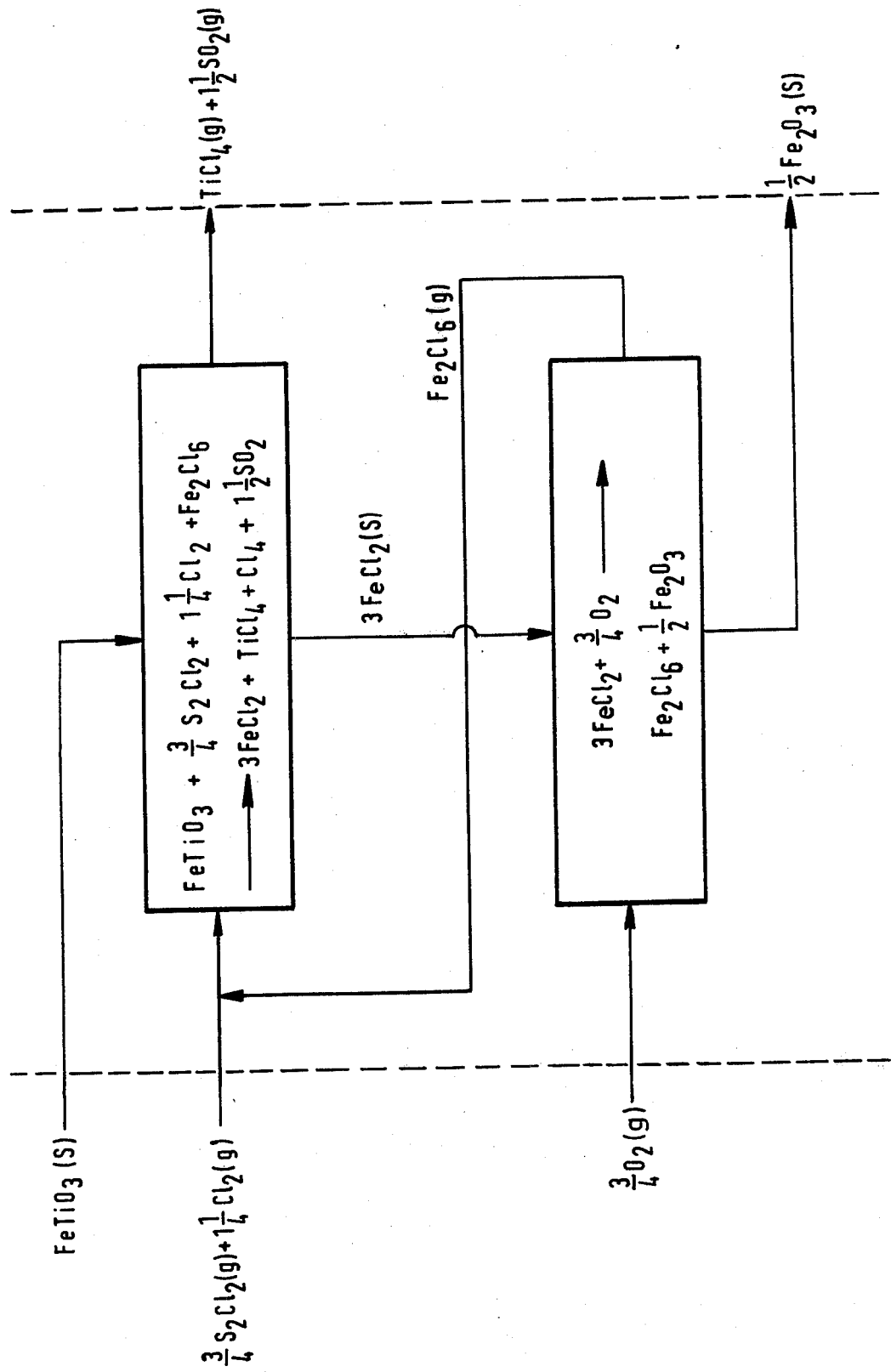

CHLORINATION OF IRON-CONTAINING MATERIALS

The predominant use of TiCl$_4$ is as an intermediate product in the production of TiO$_2$ pigment by the so-called chloride route. There are at present two main approaches to the industrial production of TiCl$_4$, both of which have serious drawbacks.

The most widespread method of manufacturing TiCl$_4$ for the chloride route to TiO$_2$ pigment is to chlorinate rutile, either the natural or the synthetic material, in the presence of carbon and/or a carbon-containing reducing agent at temperatures generally between 800° C. and 1200° C. The problem with this approach is the high cost of rutile.

The second main method of manufacturing TiCl$_4$ for the chloride route is to chlorinate a material containing titanium and iron oxides, for example ilmenite, in the presence of carbon or a carbon-containing reducing agent at temperatures between 800° C. and 1200° C. Although this approach has the important advantage of using a much lower cost and more easily available raw material, it results in the by-production of large quantities of iron chloride.

The iron chloride by-product contains a considerable content of valuable chlorine in chemically-combined form. It would normally be desirable to recover these chlorine values for recycle to the chlorinator since the market scope for iron chloride as such is considerably smaller than the by-production of iron chloride in the manufacture of TiCl$_4$. However, despite sustained effort over the last thirty years, no commercial process has yet emerged which allows the recycle of the chlorine values in the by-product iron chloride to the chlorination reaction. Instead, a large proportion of this material is dumped at sea or down deep wells.

There is therefore a need on both commercial and environmental grounds for a new approach to the production of TiCl$_4$ which avoids both the dependence on high cost rutile and the problems associated with the use of lower cost raw materials, notably the non-recovery of chlorine values from by-product iron chloride.

We have now found a method of producing TiCl$_4$ which mitigates the problems discussed above of the two main approaches to the manufacture of TiCl$_4$ in current industrial use.

This invention consists in a process for the chlorination of a material containing iron and titanium chemically combined with oxygen, comprising feeding the material to be chlorinated, a particulate solid form, into a reaction bed of solids containing ferrous chloride, and reacting it within that bed, at a temperature below the melting point of ferrous chloride, with a controlled amount of chlorine in the presence of sulphur in free or combined form, to produce solid ferrous chloride, titanium chloride, which is volatile at the temperature of operation, and sulphur dioxide, as the principal products of the process.

Representing the titaniferous material as FeTiO$_3$ the stoichiometric requirement for chlorine and sulphur may be expressed according to the equation:

$$FeTiO_{3(s)} + 1\tfrac{1}{2}S_{(g)} + 3Cl_2 \rightarrow TiCl_{4(g)} + FeCl_{2(s)} + 1\tfrac{1}{2}SO_{2(g)} \quad (1)$$

If the sulphur to chlorine ratio fed to the reactor is less than that given by the equation above it would result in ferric chloride production in addition to the above ferrous chloride production as the excess chlorine will directly chlorinate ferrous chloride according to:

$$2FeCl_{2(s)} + Cl_{2(g)} \rightarrow Fe_2Cl_{6(g)} \quad (2)$$

Conversely, if sulphur is fed in excess to the stoichiometric requirement it will appear in the off gases as elemental sulphur if all the chlorine is reacted. There is a benefit in running with at least a slight excess of sulphur as it tends to inhibit the occurence of ferric chloride in the off-gases. The use of sulphur in this way has been found to be particularly beneficial when conditions within the reactor bed are not ideal, such as if there is incomplete chlorine conversion.

The sulphur may be fed into the reactor in elemental form or combined with chlorine as a sulphur chloride, or as any other sulphur-containing compound which provides sulphur as a reducing agent, for reaction with titaniferous material, at temperatures below the melting point of ferrous chloride. Sulphur is preferably fed to the reaction bed as sulphur monochloride ($S_2Cl_2$) but may also be introduced as sulphur vapour.

Chlorine may be introduced into the reaction bed as molecular chlorine or as a compound of chlorine. Examples of suitable chlorine compounds include sulphur monochloride, sulphuryl chloride, thionyl chloride or ferric chloride. Ferric chloride may be fed in as a gas or introduced as a solid. The ferric chloride may be formed by oxidation of by-product ferrous chloride, removed from the chlorination reactor either to ferric chloride and ferric oxide or to ferric chloride, chlorine and ferric oxide by means of reaction with a controlled amount of oxygen. Thus the chlorine values leaving the chlorination reactor as ferrous chloride may be effectively recycled either entirely as ferric chloride or as a combination of ferric chloride and chlorine. Thus a preferred chlorine feed to the reactor may be in the form of a combination of sulphur monochloride, molecular chlorine and ferric chloride as in equation (3) below:

$$FeTiO_{3(s)} + \tfrac{3}{4}S_2Cl_{2(g)} + 1\tfrac{1}{4}Cl_{2(g)} + Fe_2Cl_{6(g)} \rightarrow TiCl_{4(g)} + 3FeCl_{2(s)} + 1\tfrac{1}{2}SO_{2(g)} \quad (3)$$

The reaction bed is preferably a gas-fluidised bed of solids. The fluidising gases may be reactant gases alone, e.g. as in equation (3) above, but inert gases such as nitrogen may be added to these, if necessary, e.g. to aid fluidisation and remove surplus heat. Alternatively SO$_2$ may be used for these purposes and has the additional advantage of not complicating the off-gas processing.

Alternatively, the reaction bed may be a mechanically (e.g. stirred) fluidised bed or, less preferably, some other gas/solid reactor such as a rotary kiln or a packed bed of solids with gas flowing through it may be used.

Preferably the temperature of the reaction bed is controlled between 200° C. and the melting point of ferrous chloride (677° C.). More preferably a temperature between 300° C. and 500° C. is used in order to ensure that any ferric chloride fed into or formed in the bed is available in the gas phase for reaction with the titaniferous material and in order to reduce the tendency for the product ferrous chloride to become sticky at tempertures well below its melting point. The more preferred temperature range is between 350° and 450° C.

In order to keep the reaction bed satisfactorily fluidised at temperatures above about 400° C., and in particular to prevent the product ferrous chloride within it from agglomerating together and bridging, it is normally desirable to employ a gas velocity beyond that which would normally be required to ensure fluidisation of an equivalent material which is not sticky.

The chlorination reaction is preferably carried out on a continuous basis such that the titaniferous material to be chlorinated is fed continuously in particulate solid form to the reaction bed while the $TiCl_4/SO_2$ off-gas is continuously withdrawn from the reactor top and the solid ferrous chloride is continuously removed from the reaction bed, e.g. as a bed overflow.

Under these conditions, the reaction bed preferably consists predominantly of ferrous chloride particles, with the level of titaniferous material maintained at a low level, e.g. 2% by weight in order to minimise losses in the ferrous chloride overflow from the bed. However, larger proportions of titaniferous material in the predominantly ferrous chloride bed are likely to be economically acceptable in terms of the related losses, particularly if unreacted titaniferous material is recovered from the solid residue of ferrous chloride oxidation. Lower proportions may be practicable without jeopardising the completeness of reaction between the reactant gases and the titaniferous material.

Although the reaction bed is preferably composed of ferrous chloride, titaniferous material and other non-volatile products of reaction, refractory solid particles, e.g. silica, may also be present in order to moderate the reaction temperature or to alter the physical characteristics of the bed, e.g. to improve fluidisation characteristics.

The chlorination reaction is exothermic and it is therefore necessary to remove heat from the reaction bed in order to maintain a desired substantially-constant reaction temperature. Thus if the reactant gases and solids were fed into the reaction bed in the proportions expressed in equation (3), with ilmenite and chlorine introduced at ambient temperatures and with the sulphur monochloride as a gas at its boiling point (138° C.) and with ferric chloride at 400° C., the bed temperature without external heat loss would reach about 700° C., assuming continuous operation.

The titaniferous material should preferably be thoroughly dry before feeding to the reaction bed in order to avoid significant losses of chlorine as hydrogen chloride. The other reactants should also be dry.

Ilmenite typically contains a number of minor impurities of which $SiO_2$, MgO, MnO, $Al_2O_3$ are the more important. In reaction with sulphur and chlorine at the most preferred temperatures, silica will be less attacked than is the case during high temperature carbo-chlorination. MgO and MnO will be largely converted to their chlorides in solid phase, while $Al_2O_3$ will go mainly to gaseous aluminium chloride.

The off-gas from the chlorinator operating under the most preferred conditions will contain mainly $TiCl_4$ and $SO_2$, with minor contamination from ferric chloride, hydrogen chloride, silicon tetrachloride, aluminium chloride, sulphur and ferrous chloride dust. After removing the solid particles, e.g. with cyclones for recycle to the reaction bed, the off-gas is processed by known methods to separate out and collect the various fractions. $TiCl_4$ is then available for onward processing to $TiO_2$ pigment according to the practices of the so-called chloride route, with its chlorine content preferably available for recycle to the chlorinator. The most economically appropriate use of the $SO_2$ will vary with the locational circumstances of the plant. It may, for example, be fed to a sulphuric acid plant. This could be particularly advantageous if it were practicable to dispose of the $SO_2$ to a sulphuric acid plant operating from a lean smelter off-gas. Alternatively, $SO_2$ may be converted back to sulphur by reaction with, for example $H_2S$. This could be an attractive option in the vicinity of an oil refinery. It may also be possible to dispose of at least part of the $SO_2$ into the high value liquid sulphur dioxide market.

The solid overflow from the chlorinator will contain mainly ferrous chloride, with contamination from unreacted titaniferous material, and its non-volatile post-reaction residues—principally $SiO_2$, $MgCl_2$ and $MnCl_2$.

The solids overflowing from the reaction bed are preferably passed directly, with minimum heat loss and without contact with air or moisture, to a second gas-fluidised bed containing iron oxide particles and reacted, within that bed, with oxygen.

In one embodiment of the oxidation stage, ferrous chloride is converted to ferric chloride and ferric oxide according to the equation:

$$3FeCl_{2(s)} + \tfrac{3}{2}O_{2(g)} \rightarrow Fe_2Cl_{6(g)} + \tfrac{1}{2}Fe_2O_{3(s)} \qquad (4)$$

It is preferred to maintain a small quantity (e.g. 0.25-2.5%) of ferrous chloride in the bed of ferric oxide so as to minimise the vapour phase reaction between ferric chloride and oxygen above the bed and in the exit lines from the oxidation reactor which could cause ferric oxide accretions.

The preferred temperature range for the ferrous chloride oxidation reaction (4) is between 400° C. and the melting point of ferrous chloride (about 677° C.). The most preferred temperature range is from 600° to 677° C. Since equation (4) represents a mildly exothermic reaction it will usually be necessary to preheat the oxygen, as well as feeding ferrous chloride to the oxidation reactor with minimum heat loss.

The off-gas from the oxidation reactor is preferably fed directly back to the chlorination reactor after first cycloning out the entrained solid particles. The temperature of the ferric chloride off-gas is preferably reduced in transit to between 320° C. and 400° C. so as not to add unnecessarily to the surplus heat in the chlorinator.

The bed overflow from the oxidation reactor will contain a small quantity of ferrous chloride as well as the other high boiling point chlorides such as $MgCl_2$ and $MnCl_2$. These metal chlorides are preferably removed from the iron oxide bed overflow material by means of a water leach in order to facilitate its disposal.

In another embodiment of the oxidation stage it is possible, by increasing the proportion of oxygen and by operating a bed without any excess ferrous chloride, to produce an off-gas consisting essentially of ferric chloride and chlorine with more ferric oxide in the bed overflow. This ferric chloride/chlorine gas can be recycled directly to the chlorination reactor.

While it is preferred that the chlorination and oxidation reactions represented by equations (3) and (4) are operated in tandem in a cyclic manner it is possible for the chlorination reactor to operate with the oxidation unit off-line if molecular chlorine is substituted for the $Fe_2Cl_6$ as input chlorinating gas to the chlorination reactor. Chlorine can be substituted for $Fe_2Cl_6$ without altering the fluidising gas volume per unit of available chlorine.

Compared with the carbon-chlorination of rutile, the chlorination process in accordance with this invention has the advantage of using, by preference, relatively low cost and widely available ilmenite.

Compared with the carbon-chlorination of ilmenite, the chlorination process in accordance with this invention has the principal advantage of allowing the chlorine values in by-product ferrous chloride to be recycled to the chlorinator as ferric chloride without thereby contaminating the chlorination off-gas. This in turn sets the more limited and easily attainable objective for the oxidation stage of converting ferrous chloride to ferric chloride and ferric oxide—or at most ferric chloride, chlorine and ferric oxide.

Additional advantages of the chlorination process in accordance with this invention, as compared with the carbo-chlorination of ilmenite, are listed below.

(a) Ilmenites and titanium slags with relatively high concentrations of MgO, MnO or CaO can be processed without the consequent problems of forming molten phases in the chlorination reactor or of handling high-boiling point gases.

(b) The off-gas from the chlorination reactor is comparable in complexity of handling to that from the chlorinating of rutile.

(c) The significantly lower chlorination temperatures involve less rigorous materials of construction requirements.

(d) Chlorine losses are reduced by, for example, the use of sulphur as opposed to hydrogen-containing petroleum coke as the reducing agent.

(e) Significant credits are possible from the sale or reprocessing of the product $SO_2$ and $Fe_2O_3$ The invention will be better understood by reference to the attached simplified flowsheet which shows the relationship of one embodiment of the chlorination stage (equation 3) to one embodiment of the oxidation stage (equation 4). Qunatities are given in molar terms without allowance for losses and other minor variations. Operations carried out before the two process stages illustrated in the flowsheet (e.g. sulphur monochloride production) as well as operation carried out subsequently (e.g. processing the chlorination off-gas) are not illustrated. Input to the two process stages are given in the left-hand column, and output are in the right-hand column.

The invention will be further explained by reference to the following non-limiting Examples. Example 1 describes the sulpho-chlorination of West Australian beach ilmenite in a stirred-bed reactor in the presence of ferrous chloride. Example 2 describes the sulpho-chlorination of West Australian beach sand ilmenite in a gas-fluidised bed reactor containing ferrous chloride. Example 3 describes the oxidation of ferrous chloride to yield ferric chloride and ferric oxide as claimed in claim 12.

EXAMPLE 1

A 75 gram mixture (analysis below) of West Australian ilmenite and anhydrous ferrous chloride was placed in a vertical stirred bed reactor. The reactor was externally heated until the bed temperature reached 400° C. During the heat-up, nitrogen was fed through the material and the reactor system. When the bed temperature had stabilized at 400° C. and after sufficient nitrogen had been flushed through the reactor system to render it inert, the nitrogen was discontinued. A gaseous mixture of $S_2Cl_2$ and $Cl_2$ was then fed to the reactor at a flow rate of 0.17 grams per minute for $S_2Cl_2$ and 0.25 grams per minute for $Cl_2$. Given the proportions of $TiO_2$:$FeO$:$Fe_2O_3$ in the ilmenite this ratio of $S_2Cl_2$ to $Cl_2$ was calculated to provide a slight deficiency of chlorine. As the sulpho-chlorinating gases were fed to the reactor, the bed temperature increased from 400° C. to 460° C. at 15 minutes. The external heater remained set at 400° C., and the temperature of the bed held at 460° C. for the rest of the run. $TiCl_4$ and $SO_2$ left the reactor in the gas together with some $FeCl_3$ during the second half of the run only. The two chlorides were collected in a cooled condenser, and $SO_2$ was absorbed in a water scrubbing tower. The run lasted for 90 minutes, during which time enough $S_2Cl_2$ and $Cl_2$ was used to react with about half the ilmenite. The bed residue weighed 64.7 grams. The analyses of the feed and solid residue were as follows:

| FEED | | | RESIDUE | | |
|---|---|---|---|---|---|
| | grams | % | | grams | % |
| Iron | 27.4 | 36.5 | Iron | 24.2 | 37.4 |
| Titanium | 12.4 | 16.5 | Titanium | 6.3 | 9.8 |
| Chloride | 21.5 | 28.7 | Chloride | 26.1 | 40.3 |
| Total | 75.0 | 100.0 | Total | 64.7 | 100.0 |

Thus about half the titanium was extracted from the ilmenite, as $TiCl_4$. This result was confirmed by an analysis of the condenser in which the volatile chlorides were collected.

The quantity of $FeCl_2$ in the bed rose from 38.4 grams in the feed to 46.7 grams in the residue, as calculated from the chloride figures given above (21.5 grams and 26.1 grams respectively). In percentage terms, the weight of ferrous chloride in the bed rose from 51 to 72% between the beginning and the end of the run.

The extraction of iron during the run (as $FeCl_3$) was 12% of the starting weight, as judged both by the difference between the feed and residue analyses and by the content of the condensers in which the volatile chlorides were collected.

EXAMPLE 2

Sulpho-chlorination of West Australian ilmenite was carried out in a 100 mm diameter fluid bed reactor at a temperature of 450° C. The reactor comprised a bed plate containing nine 1/16" dia. holes with bubble caps set into a silica reactor tube. The reactor bed consisted of a charge of 1400 gms of anhydrous ferrous chloride of particle size within the range 63µ–150µ together with an addition of 10 wt. % Australian ilmenite, also screened to give a size range of 63µ–150µ. This gave a bed depth within the reactor of 280 mm, or an aspect ratio of 2.8:1.0. Throughout the heating up period the bed was maintained in a fluidized state using nitrogen. To start the run the reagent feed gases were fed to the bed and the nitrogen feed progressively reduced while maintaining fluidization of the bed. The state of fluidization of the bed was ascertained by monitoring the gas pressure drop across the bed and by comparison with previous open top trials with ferrous chloride when the bed was visually inspected. Fluidization was ultimately achieved with a reagent gas flow of 6 liters per minute comprising a total chlorine feed to the reactor (both as chlorine and sulphur monochloride) of 17.4 gms/min and a sulphur to chloride atomic ratio of 0.35. Throughout the run ilmenite was fed to the bed sufficient to maintain the ilmenite concentration of the bed. Analysis of the furnace products showed that the chlorine was proportioned amongst them according to the following table:

| Product | Mole Ratio w.r.t. SO$_2$ | Fraction % of input Cl$_2$ reporting to product |
|---|---|---|
| TiCl$_4$ (gas) | 0.67 | 0.65 |
| FeCl$_2$ (solid) | 0.65 | 0.31 |
| Fe$_2$Cl$_6$ (gas) | 0.01 | 0.01 |
| Cl$_2$ (gas) | 0.06 | 0.03 |

This can be seen to correspond to a chlorine efficiency of 96%. Also from the TiCl$_4$/SO$_2$ ratio the titanium content of the ilmenite was removed stoichiometrically as the tetrachloride.

EXAMPLE 3

The reaction was carried out in a fluidized bed reactor of 100 mm internal diameter in a continuous manner.

Before initiating the reaction, approximately 5% by weight of solid ferrous chloride was added to the fluidized bed which consisted of approximately 4 kg of iron oxide particles giving a bed depth of 200 mm, i.e. an aspect ratio of 2:1. The bed was fluidized with nitrogen to ensure good mixing of the 5% ferrous chloride with the iron oxide and the temperature was equilibrated at 600° C.

The reaction was initiated by the addition of 4.0 liters per minute oxygen with 2.7 liters per minute nitrogen, the latter serving to assist fluidization behaviour. At the same time a feed of 80 grams per minute solid ferrous chloride was introduced into the bed to react with oxygen to give ferric chloride and iron oxide while maintaining a small percentage of excess ferrous chloride in the bed.

After allowing time for conditions to stabilize a sample of off-gases was taken from a point immediately after the furnace exit and was analysed for chlorine, oxygen and ferric chloride. The molar ratios of these products was found to be as follows:

| Cl$_2$ | O$_2$ | FeCl$_3$ |
|---|---|---|
| 0.022 | <0.004 | 1 |

After stopping oxygen and ferrous chloride flows the bed was sampled and analysed for residual ferrous chloride giving a result of 0.1% FeCl$_2$ w/w. This demonstrates that the 5% w/w FeCl$_2$ initially added to the bed had been consumed and that a low excess level of FeCl$_2$ is adequate to consume all oxygen.

I claim:

1. A process for the chlorination of a solid material containing iron and titanium chemically combined with oxygen, comprising feeding the material to be chlorinated in particulate solid form into a fluidized bed of solids containing ferrous chloride at a temperature between about 200° C. and 677° C., and simultaneously feeding to said fluidized bed at least one chlorinating agent selected from the group consisting of molecular chlorine, sulphur monochloride, and ferric chloride, and a source of sulphur selected from the group consisting of elemental sulphur and sulphur monochloride, the free and combined chlorine and sulphur being present in such molar proportions, relative to the starting material containing iron, titanium, and oxygen, as to produce, as principal reaction products, only solid ferrous chloride, sulphur dioxide gas, and titanium tetrachloride vapor.

2. The process according to claim 1 comprising introducing the sulphur into the reaction bed as elemental sulphur.

3. The process according to claim 1 comprising introducing the sulphur into the reaction bed as sulphur monochloride.

4. The process according to claim 1 comprising introducing the chlorine as molecular chlorine and sulphur monochloride.

5. The process according to claim 1 comprising introducing the chlorine as a mixture of sulphur monochloride, molecular chlorine and ferric chloride.

6. The process according to claim 5 wherein the ferric chloride is produced by oxidation of ferrous chloride removed from the chlorination reaction bed.

7. The process according to claim 1 wherein the reaction bed is a gas-fluidised bed of solids.

8. The process according to claim 1 wherein the reaction bed is a mechanically-fluidised bed of solids.

9. The process according to claim 1 wherein the reaction bed temperature is between 300° and 500° C.

10. The process according to claim 9 wherein the reaction bed temperature is between 350° and 450° C.

11. The process according to claim 1 further comprising removing ferrous chloride from the chlorination reaction bed and oxidizing the removed ferrous chloride to yield ferric chloride for recycle to the chlorination reaction bed.

12. The process according to claim 11 wherein the ferric chloride produced by oxidation is returned to the chlorination reaction bed, without condensation, to act as part of the chlorine reactant fed to the bed.

13. The process according to claim 1 further comprising removing ferrous chloride from the chlorination reaction bed and oxidizing the removed ferrous chloride to yield ferric chloride and chlorine, for recycle to the chlorination reaction bed.

14. The process according to claim 13 wherein the chlorine and ferric chloride produced by oxidation are returned to the chlorination reaction bed, without condensation, to act as part of the chlorine reactant fed to the bed.

15. The process according to claim 1 wherein the material to be chlorinated is ilmenite.

16. The process according to claim 1 wherein the material to be chlorinated is a titanium slag.

* * * * *